US007198036B2

(12) United States Patent
White

(10) Patent No.: US 7,198,036 B2
(45) Date of Patent: Apr. 3, 2007

(54) SYSTEM AND METHOD FOR COOLING AIR INTAKE

(75) Inventor: James E. White, Greenwich, OH (US)

(73) Assignee: Thermo-Tec High Performance Automotive, Inc., Greenwich, OH (US)

( * ) Notice: Subject to any disclaimer, the term of this patent is extended or adjusted under 35 U.S.C. 154(b) by 104 days.

(21) Appl. No.: 11/160,865

(22) Filed: Jul. 13, 2005

(65) Prior Publication Data

US 2006/0011177 A1  Jan. 19, 2006

Related U.S. Application Data

(60) Provisional application No. 60/588,298, filed on Jul. 14, 2004.

(51) Int. Cl.
*F02M 15/00* (2006.01)

(52) U.S. Cl. .................................................. 123/542

(58) Field of Classification Search ................ 123/540, 123/542
See application file for complete search history.

(56) References Cited

U.S. PATENT DOCUMENTS

| 5,558,069 A | 9/1996 | Stay |
| 6,247,460 B1* | 6/2001 | Lindberg et al. ............ 123/563 |
| 2005/0081834 A1* | 4/2005 | Perkins ........................ 123/563 |
| 2005/0091977 A1* | 5/2005 | Holtman et al. ........... 60/605.2 |

OTHER PUBLICATIONS

Arizona Vortex Tube Manufacturing Company, "Vortex Tubes," Internet Website, 1 page, (printed on Nov. 16, 2005).

* cited by examiner

*Primary Examiner*—Erick Solis
(74) *Attorney, Agent, or Firm*—Hahn Loeser & Parks, LLP; Robert J. Clark

(57) ABSTRACT

A system and method for increasing the horsepower and torque provided by an internal combustion engine involve the use of a vortex tube to provide cooled air to the air intake of the engine. The system utilizes a source of compressed air such as provided by a compressor and air tank. The compressed air is injected into the vortex tube producing a heated stream of air and a cooled stream of air. The cooled stream of air is directed into the intake of the engine. The system enhances the air flow and drops the induction air temperature into the engine. An air valve may be used to control the flow of compressed air into the vortex tube.

16 Claims, 2 Drawing Sheets

SYSTEM AND METHOD FOR COOLING AIR INTAKE

CROSS-REFERENCE TO RELATED APPLICATIONS/INCORPORATION BY REFERENCE

This application claims the benefit of U.S. Provisional Application Ser. No. 60/588,298, filed Jul. 14, 2004, which is hereby incorporated by reference.

TECHNICAL FIELD

Certain embodiments of the present invention relate to air cooling systems. More particularly, certain embodiments of the present invention relate to a system and a method for providing cooled air to an internal combustion engine for increasing the horsepower and torque provided by the internal combustion engine.

BACKGROUND OF THE INVENTION

Engine performance of an internal combustion engine is affected by the temperature of the fuel therein. Increased temperatures decrease the efficiency of combustion.

U.S. Pat. No. 5,558,069 to Stay describes an apparatus and method for cooling or heating fluids, such as fuel in a fuel system of an automotive vehicle. Compressed gas is delivered to a vortex tube or air amplifier so that the gas rapidly expands and cools, thereby cooling a first end of the vortex tube in relation to a warmer second end thereof. A first fuel inlet port of a first heat exchanger lies proximate the first end so that fuel flowing into the inlet port is cooled by thermal contact with the first end of the vortex tube. A cooled fuel outlet port in the heat exchanger lies proximate the first end so that cooled fuel may leave the heat exchanger for delivery to an engine.

U.S. Pat. No. 6,502,405 to Van Winkle describes a vehicle system for transferring thermal energy in relation to a vehicle which includes at least one thermoelectric device, having at least two surfaces, concurrently dissipating thermal energy on a first surface and absorbing thermal energy on a second surface, mounted in proximity to a contained vehicle fluid so as to provide thermal communication between the contained vehicle fluid and either the cooler or the warmer surface of the thermoelectric device.

U.S. Pat. No. 2003/0234008 to Van Winkle describes a fluid heat exchanger apparatus and associated method for cooling a fluid having an exhaust component associated with an internal combustion engine, the apparatus including: at least one thermoelectric device, concurrently absorbing thermal energy on a cool side and dissipating thermal energy on a warm side; a cool fluid conduit containing a cool fluid within a first closed loop, the cool fluid being in thermal communication with the cool side of at least the one thermoelectric device; and, a warm fluid conduit containing a warm fluid within a second closed loop, the warm fluid being in thermal communication with the warm side of at least the one thermoelectric device; where the cool fluid conduit is positioned to be in thermal communication with an internal combustion engine fluid stream having an exhaust component, thereby cooling the internal combustion engine fluid stream having the exhaust component.

U.S. Pat. No. 2003/0057512 to Sterzel et al. describes a thermoelectric generator or Peltier arrangement having a thermoelectrically active semiconductor material constituted by a plurality of metals or metal oxides. The thermoelectrically active material is selected from a p- or n-doped semiconductor material constituted by a ternary compound.

U.S. Pat. No. 2003/0188725 to Van Winkle describes an apparatus for carrying out a method for transferring thermal energy in relation to a gas traveling through a gas intake to an internal combustion engine comprising the steps of: providing at least one thermoelectric device having at least two surfaces, concurrently dissipating thermal energy on a warmer surface and absorbing thermal energy on a cooler surface; and establishing a thermal gradient between the gas within the gas intake to the internal combustion engine and the cooler surface of the thermoelectric device.

U.S. Pat. No. 2003/0140636 to Van Winkle describes a vehicle system for transferring thermal energy in relation to a vehicle fluid which includes at least one thermoelectric device, having at least two surfaces, concurrently dissipating thermal energy on a first surface and absorbing thermal energy on a second surface, mounted in proximity to a contained vehicle fluid so as to provide thermal communication between the contained vehicle fluid and either the cooler or the warmer surface of the thermoelectric device.

U.S. Pat. No. 6,067,970 to Awarzamani et al. describes a fuel injection device for an internal combustion engine having a fuel injection valve which sprays the fuel in the direction of an inlet valve and includes an electric heating element for the fuel before it reaches an inlet valve.

U.S. Pat. No. 5,174,266 to Evdokimo describes a fuel temperature control system that maintains fuel at a programmable temperature by adding heat to or drawing heat from the fuel as it passes through a heat exchanger.

U.S. Pat. No. 6,718,954 to Ryon describes an apparatus for cooling fuel by means of the cold side of a thermoelectric unit just prior to entry of the fuel into the fuel delivery components (injectors, carburetors and throttle bodies).

Further limitations and disadvantages of conventional, traditional, and proposed approaches will become apparent to one of skill in the art, through comparison of such systems and methods with the present invention as set forth in the remainder of the present application with reference to the drawings.

SUMMARY OF THE INVENTION

An embodiment of the present invention provides a system for cooling the air intake of an internal combustion engine. The system comprises an internal combustion engine having an engine air intake; a vortex tube connected to the engine air intake; and a source of compressed air attached to the vortex tube. The compressed air is injected into the vortex tube such that the vortex tube creates a cool stream of air that is directed to the engine air intake.

Another embodiment of the present invention comprises a method for increasing the horsepower and torque provided by an internal combustion engine. The method includes generating a volume of compressed air and feeding the volume of compressed air to an input of a vortex tube to generate a stream of cooled air from an output of the vortex tube. The method further includes feeding the stream of cooled air to an engine air intake of an internal combustion engine.

These and other advantages and novel features of the present invention, as well as details of an illustrated embodiment thereof, will be more fully understood from the following description and drawings.

DETAILED DESCRIPTION OF THE INVENTION

Figure 1:
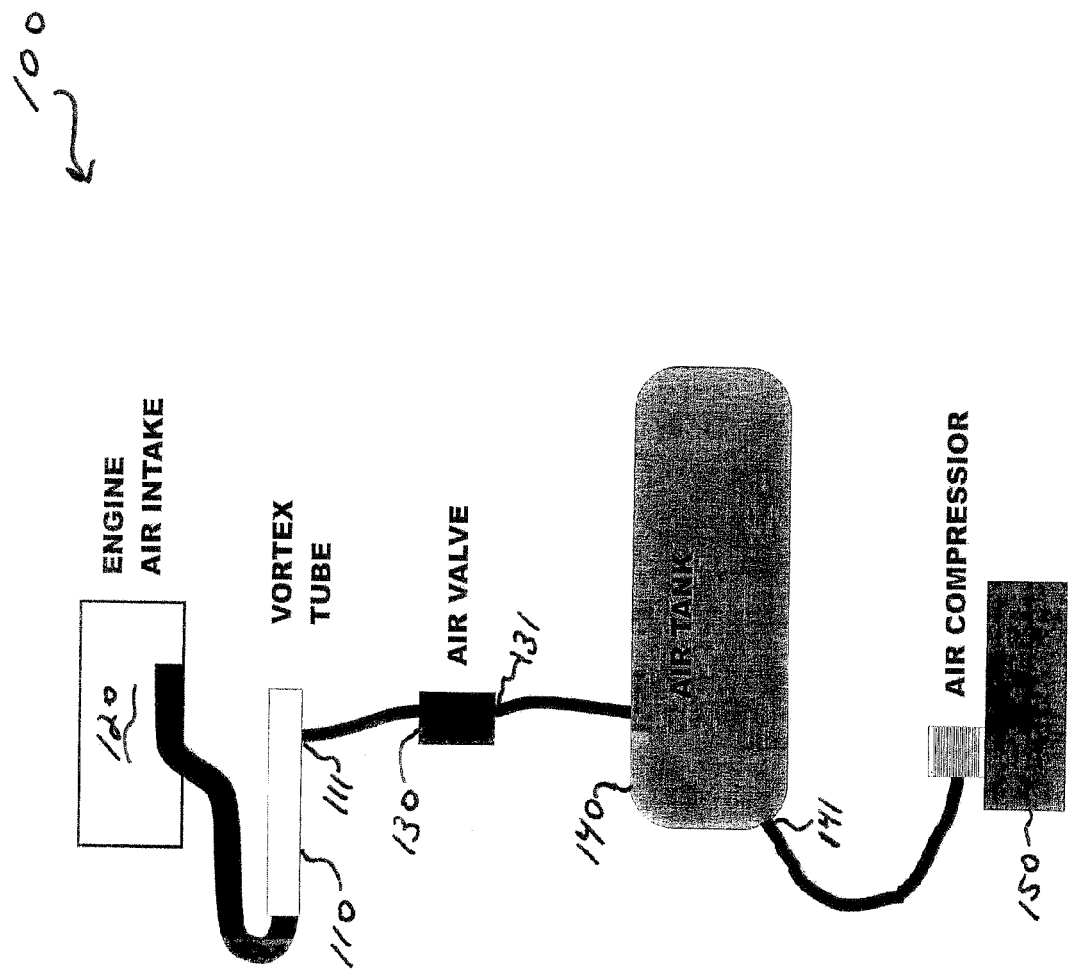
FIG. 1 illustrates an embodiment of a system for increasing the horsepower and torque provided by an internal combustion engine, in accordance with various aspects of the present invention.

FIG. 1 illustrates an embodiment of a system 100 for increasing the horsepower and torque provided by an internal combustion engine, in accordance with various aspects of the present invention. The system 100 comprises a vortex tube 110 connected to an engine air intake 120 of an internal combustion engine (not shown) to provide cooled air to the engine air intake 120. The system 100 further comprises an air valve 130 connected to an input 111 of the vortex tube 110 to control a flow of air to the vortex tube 110. The system 100 also includes an air tank 140 connected to an input 131 of the air valve 130 to provide compressed air to the air valve 130. The system 100 also comprises an air compressor 150 connected to an input 141 of the air tank 140 to pressurize air within the air tank 140. The connections between the various elements 110, 120, 130, 140, and 150 may be accomplished using standard hoses, conduits, or tubing capable of holding the air pressures produced by the air compressor 150.

A vortex tube is a device with no moving parts which will convert an ordinary stream of compressed air into two streams, one hot and one cold. A vortex tube can produce cold air down to −50° F. and hot air up to 260° F. The system 100 enhances the air flow and drops the induction air temperature into an internal combustion engine by blowing cold air into the air intake 120 of the internal combustion engine.

In accordance with an embodiment of the present invention, compressed air is injected circumferentially into the vortex tube at sonic speed and creates a cyclone (i.e., vortex) spinning at about a million revolutions per minute within the tube. Some of the air is forced to spin inward to the center and travels up the long tube where a valve turns the spinning column (i.e. vortex) of air inside itself. The inside column of air gives up its heat to an outside column. The resultant cold air is directed out the cold end of the vortex tube and into the engine air intake 120. The resultant hot air is exhausted out of the other end of the vortex tube. The temperature and air flow is controllable by adjusting a control knob on the hot end of the vortex tube. The pressure of the air provided to the input 111 of the vortex tube 110 is typically between 10 psig and 120 psig.

When the cooled air into the engine air intake mixes with fuel within the internal combustion engine, an increase in the efficiency of the combustion process occurs. For every 10 degrees of cooling of the air/fuel mixture, a 1% gain in horsepower and torque may be achieved for a normally aspirated engine. A 2% gain may be achieved for a forced air induction engine (e.g., turbo, super charger, etc.).

The air of the air/fuel mixture contains oxygen to help with combustion. The air supplied by the air tank 140 may contain normal concentrations of oxygenated air or may contain air having enhanced oxygen levels. Theoretically, pure oxygen may be used as the source of air. In accordance with an embodiment of the present invention, the air valve 130 includes an air filter to remove particulate matter from the pressurized air being provided to the vortex tube 110. As an alternative, an air filter may be included elsewhere in the system 100, for example, between the air tank 140 and the air valve 130, or between the air valve 130 and the vortex tube 110.

Figure 2:
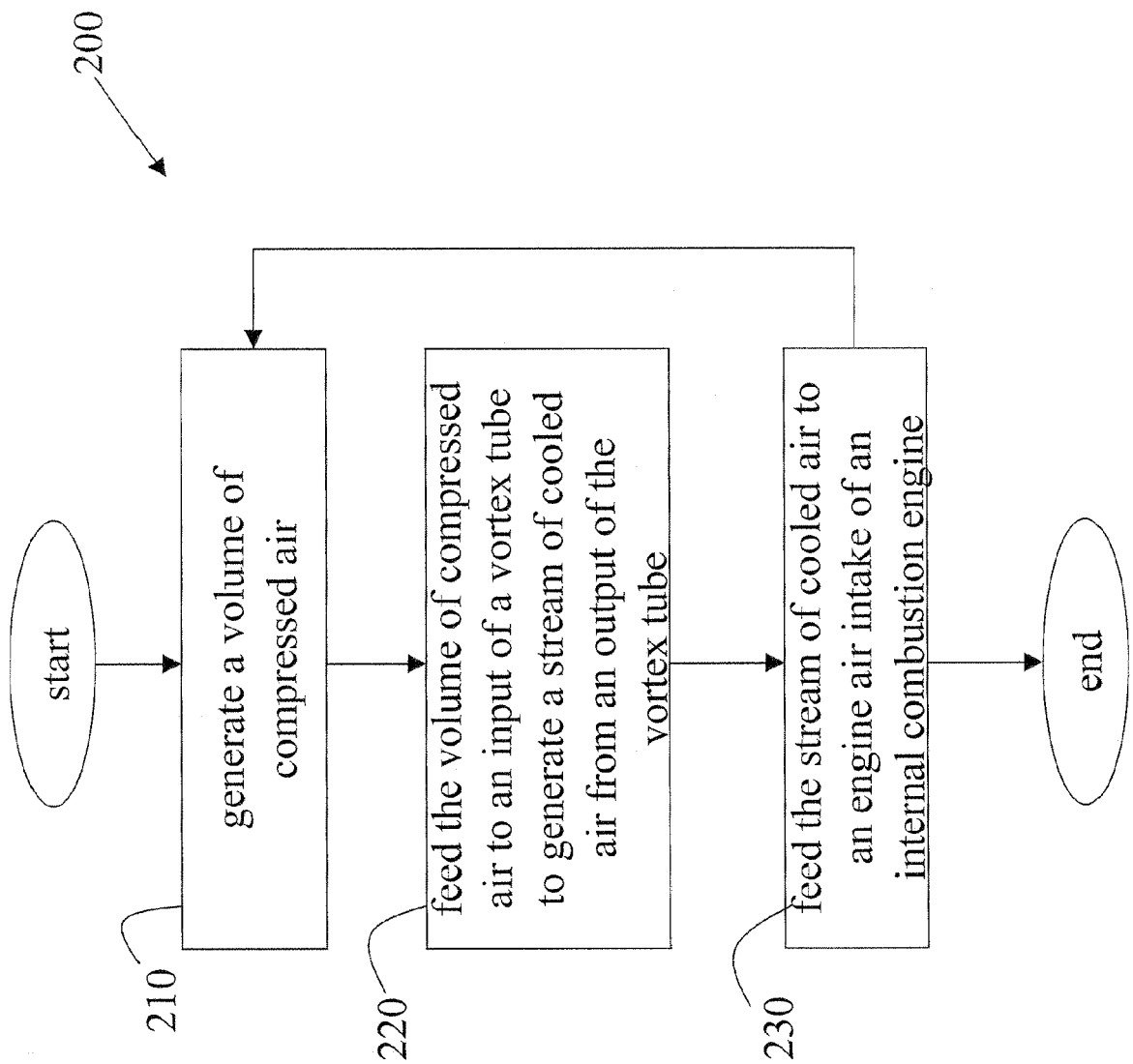
FIG. 2 is a flow chart of an embodiment of a method for increasing the horsepower and torque provided by an internal combustion engine using the system of FIG. 1, in accordance with various aspects of the present invention.

FIG. 2 is a flow chart of an embodiment of a method 200 for increasing the horsepower and torque provided by an internal combustion engine using the system 100 of FIG. 1, in accordance with various aspects of the present invention. In step 210 of the method 200, a volume of compressed air is generated. In step 220, the volume of compressed air is fed to an input of a vortex tube to generate a stream of cooled air from an output of the vortex tube. In step 230, the stream of cooled air is fed to an engine air intake of an internal combustion engine. The process is continued in order to provide a constant stream of cooled air to the engine air intake 120.

In accordance with an embodiment of the present invention, the air valve 130 is opened to allow compressed air to pass whenever the internal combustion engine is running (i.e., combusting). For example, an electrical signal from the engine may be used to open and close the air valve 130. In accordance with an alternative embodiment of the present invention, the air valve 130 is a passive valve that remains closed until the compressed air at the input 131 to the air valve 130 reaches a certain pressurization level which causes the valve 130 to open. Such an alternative embodiment ensures that the stream of air entering the vortex tube 110 is of a certain minimum velocity.

In accordance with still another alternative embodiment of the present invention, the air valve 130 is not used in the system 100. That is, the compressed stream of air is directed directly from the air tank 140 to the vortex tube 110. In accordance with still another embodiment of the present invention, the opening and closing of the air valve 130 may be controlled to produce period bursts of pressurized air to the vortex tube 110 at a certain duty cycle. The duty cycle of the periodic bursts may be controlled to effect a certain temperature of the air/fuel mixture within the engine. Such control may be provided by a microprocessor which may be part of the system 100 or may be external to the system 100 (e.g., a microprocessor of the engine itself). Other control embodiments are possible as well.

In accordance with an embodiment of the present invention, the system 100 is installed in a vehicle such as, for example, a car or a truck. The air compressor 150 may be powered by the electrical system of the vehicle or may include its own power source such as a battery, in accordance with various embodiments of the present invention. As an alternative embodiment, the air compressor 150 may be an air compressor which is already a part of the vehicle, such as for a braking system, instead of a separate, dedicated air compressor. As a result, such an air compressor is shared between the braking system of the vehicle and the system 100.

Since the vortex tube 110 produces a stream of heated air as well as a stream of cooled air, in accordance with an embodiment of the present invention, the stream of heated air may be used as a source of energy for other systems within the vehicle. For example, the stream of heated air could be directed toward a thermoelectric converter within the vehicle such that the thermoelectric converter converts the thermal energy provided by the heated air stream into electrical energy which may be used to help power various systems of the vehicle.

In summary, the air/fuel mixture in an internal combustion engine is reduced in temperature by injecting cooled air, via a vortex tube, into an engine air intake of the internal combustion engine. The resultant cooled air/fuel mixture increases the efficiency of combustion of the air/fuel mixture, providing increased horsepower and torque from the engine.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for cooling the air intake of an internal combustion engine, the system comprising:
    an internal combustion engine having an engine air intake;
    a vortex tube connected to the engine air intake;
    a source of compressed air attached to the vortex tube;
    wherein the compressed air is injected into the vortex tube wherein the vortex tube creates a cool stream of air that is directed to the engine air intake; and
    an air valve connected to an input of the vortex tube to control the flow of air to the vortex tube.

2. The system of claim 1, wherein the source of compressed air comprises an air tank having an inlet and an outlet; and an air compressor connected to the input of the air tank to pressurize air within the air tank.

3. The system of claim 1, wherein the air valve remains closed until the compressed air at the input to the air valve reaches a predetermined pressurization level which causes the air valve to open.

4. The system of claim 1, wherein the stream of cool air provided by the vortex tube is at a temperature lower than the air entering the vortex tube.

5. The system of claim 1, wherein the temperature and the flow rate of the stream of cool air provided by the vortex tube is controllable by adjusting a control knob on the vortex tube.

6. The system of claim 1, wherein the air valve includes a filter.

7. The system of claim 1, wherein the compressed air provided to the vortex tube is generally between 10 psig and 120 psig.

8. The system of claim 1, wherein the vortex tube creates a heated stream of air which is directed away from the engine air intake.

9. A system for cooling the air intake of an internal combustion engine, the system comprising:
    an internal combustion engine having an engine air intake;
    a vortex tube connected to the engine air intake; and
    an air tank having an inlet and an outlet;
    an air compressor connected to the inlet of the air tank to pressurize air within the air tank; and
    an air valve connected to an inlet of the vortex tube to control the flow of compressed air from the air tank to the vortex tube;
    wherein the compressed air is injected into the vortex tube such that the vortex tube creates a cool stream of air that is directed to the engine air intake.

10. The system of claim 9, wherein the compressed air provided to the vortex tube is generally between 10 psig and 120 psig.

11. The system of claim 9, wherein the air valve remains closed until the compressed air at the input to the air valve reaches a predetermined pressurization level which causes the air valve to open.

12. The system of claim 9, wherein the vortex tube creates a heated stream of air which is directed away from the engine air intake.

13. A method for increasing the horsepower and torque provided by an internal combustion engine, the method comprising the steps of:
    providing an internal combustion engine having an engine air intake, a vortex tube connected to the engine air intake, and a source of compressed air attached to the vortex tube;
    injecting a volume of compressed air into the vortex tube wherein the vortex tube creates a cooled stream of air and a heated stream of air from the injected compressed air;
    directing the cooled stream of air from the vortex tube into the engine air intake; and
    controlling the injection of compressed air into the vortex tube using an air valve.

14. The method of claim 13, wherein the step of injecting compressed air into the vortex tube is accomplished only when the source of compressed air is between 10 psig and 120 psig.

15. The method of claim 13, wherein the step of providing a source of compressed air is accomplished by providing an air tank and an air compressor.

16. The method of claim 13, further comprising the step of controlling the temperature and the flow rate of the stream of cool air provided by the vortex tube by adjusting a control knob on the vortex tube.

* * * * *